J. C. BEEM.
MILKING MACHINE.
APPLICATION FILED MAY 16, 1919.
1,377,547.
Patented May 10, 1921.
2 SHEETS—SHEET 1.
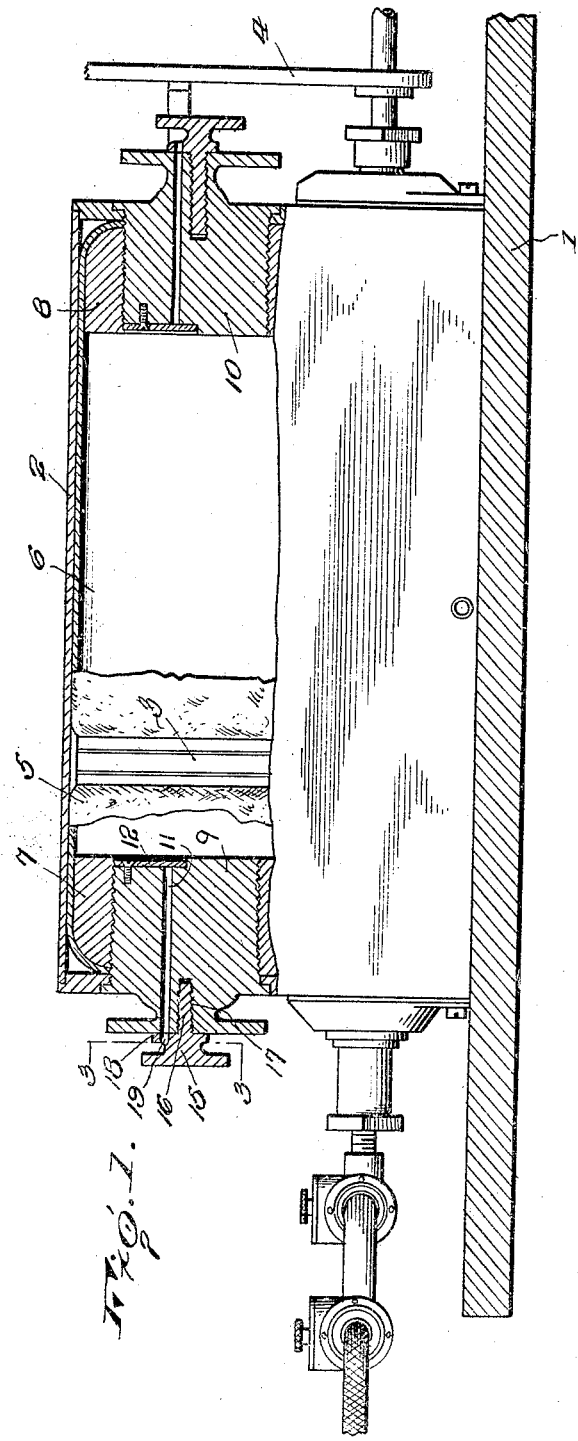
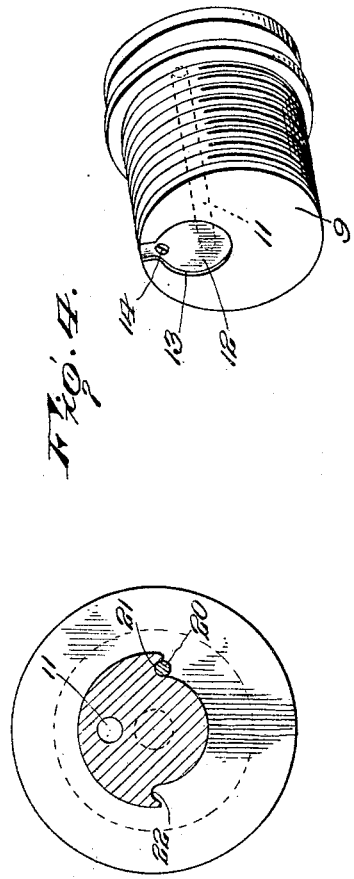
INVENTOR
J. C. Beem.
by Lacey & Lacey
ATT'YS.

J. C. BEEM.
MILKING MACHINE.
APPLICATION FILED MAY 16, 1919.
1,377,547.
Patented May 10, 1921.
2 SHEETS—SHEET 2.
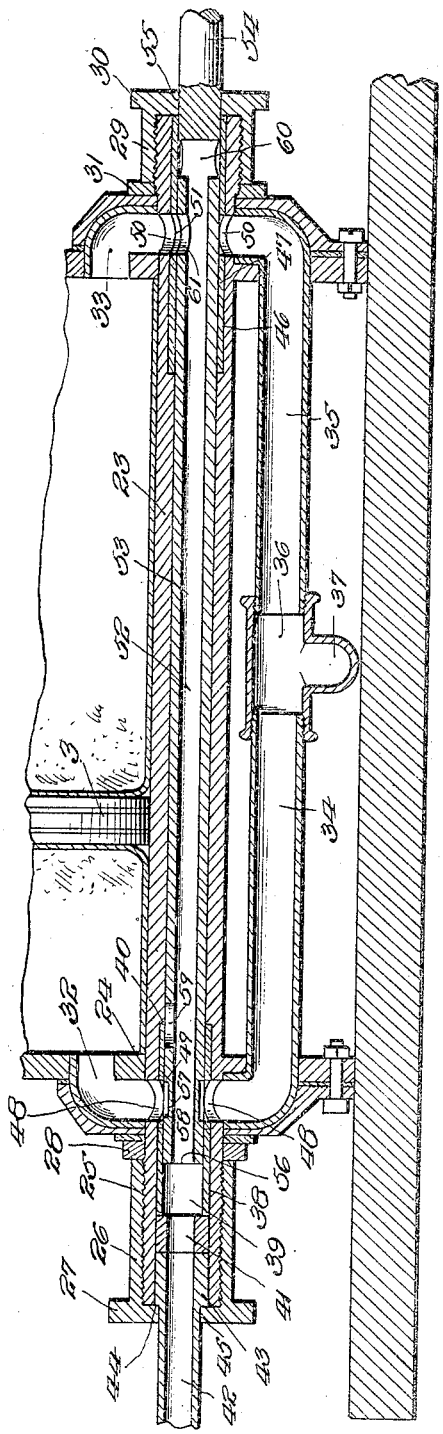
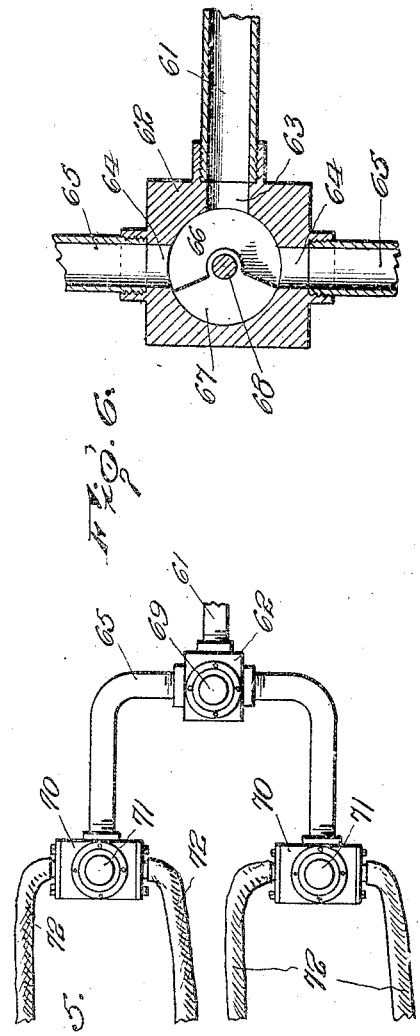
INVENTOR:
J. C. Beem.
by Lacey & Lacey
Attys

UNITED STATES PATENT OFFICE.

JOHN C. BEEM, OF SAWTELLE, CALIFORNIA.

MILKING-MACHINE.

1,377,547. Specification of Letters Patent. Patented May 10, 1921.

Application filed May 16, 1919. Serial No. 297,500.

*To all whom it may concern:*

Be it known that I, JOHN C. BEEM, a citizen of the United States, residing at Sawtelle, in the county of Los Angeles and State of California, have invented certain new and useful Improvements in Milking-Machines, of which the following is a specification.

This invention relates to milking machines and is designed more particularly as an improvement on the milking machine forming the subject matter of my copending application filed October 4, 1918, Serial No. 256,846.

In the structure embodied in my said copending application I have found that if in the operation of the machine an insufficient quantity of milk is drawn into either end of the machine to fill the said end, it is not practicable to complete the stroke of the piston in the direction in which it is moving at that time. Therefore it is one of the primary objects of the present invention to provide means whereby, under such conditions, air may be admitted into either end of the cylinder, so that the stroke of the piston may be completed and the milk contained within either end of the cylinder may be completely discharged therefrom.

Another object of the invention is to improve the construction of the valve devices for controlling the inflow of milk to the cylinder and the outflow of milk therefrom.

A further object of the invention is to provide means whereby a greater number of cows may be milked simultaneously in the operation of the machine than is possible in the structure shown in my said copending application.

In the accompanying drawings:

Figure 1 is a view partly in side elevation and partly in vertical longitudinal section illustrating the machine embodying the invention;

Fig. 2 is a similar view illustrating the valve mechanism for controlling the inflow and outflow of the milk;

Fig. 3 is a vertical transverse sectional view on the line 3—3 of Fig. 1;

Fig. 4 is a perspective view of one of the removable heads for the cylinder;

Fig. 5 is a top plan view illustrating the devices whereby the machine is adapted for simultaneous milking of four cows;

Fig. 6 is a detail horizontal sectional view through one of the valves shown in Fig. 5.

As, except for the improvements to be hereinafter specifically pointed out, the apparatus is fully illustrated and described in my said copending application, it is thought that a brief description of the features common to the two applications will herein suffice. In the drawings the numeral 1 indicates the base of the machine and upon this base there is mounted a casing 2 which is substantially cylindrical and in which reciprocates a piston head 3, the movement of this piston head being effected by any suitable means as for example a manually or power operated head 4 having suitable connection therewith. The numerals 5 and 6 indicate two receiving chambers which are of rubber or other suitable elastic material and which are secured at adjacent ends to the opposite sides of the piston head 3 and at their relatively remote ends are secured within the casing to preferably two heads indicated by the numerals 7 and 8 respectively, which are arranged within the ends of the said casing. In the reciprocation of the piston head 3, the milk will be drawn through the medium of valve devices to be presently described alternately into the chambers 5 and 6 and alternately discharged therefrom.

As heretofore pointed out in the structure of the copending application, it is impracticable to reciprocate the piston if milk is drawn from the udder of the cow in insufficient quantity to fill either receiving chamber at such time open by way of the valve device for the inflow of milk. This difficulty is remedied by means which will now be described. The numerals 9 and 10 indicate cleanout heads or plugs which are threaded into openings in the heads 7 and 8 respectively, one of these plugs being most clearly shown in Fig. 4 of the drawings. In the present construction each plug is formed with an air inlet opening or duct 11 extending longitudinally therethrough and opening at its ends through the inner and outer ends of the respective plug. A check valve 12 of the flap type is mounted in a recess 13 formed in the inner face of the respective head or plug and secured by means of a screw or other suitable fastening element 14 and as the inner end of the respective opening or duct 11 communicates with this recess 13, the valve 12 will normally close the said duct so that when the piston head 3 is moving in the direction of the said respective head, the valve will be closed and no air can escape from the respective receiving chamber by way of the said opening or duct. However, when the said opening or duct 11 is open and the piston head 3 is moving in a direction to create a suction within the respective receiving chamber 5 or 6 as the case may be, under conditions to be presently explained, air will be permitted to enter the said receiving chamber by way of the said duct. In order that the passage of air through each duct may be controlled at the will of the operator, a valve device is provided and this device comprises a head 15 having a threaded shank 16 fitted into a threaded bore 17 formed in the respective clean-out head or plug at the outer end thereof. The said head is provided with a circumferential flange 18 having an opening 19 therein and the head may be manually rotated so as to position the opening 19 in or out of registration with the outer end of the respective duct 11. In order to limit such rotative movement of the head 15, a stop pin or shoulder 20 is provided upon the outer face or end of the said respective clean-out plug and the flange 18 is formed with shoulders 21 and 22 located at spaced points in its circumference and adapted to engage against the said pin or shoulder 20. Thus for example when the head 15 is in position with the shoulder 21 engaging the pin as shown in Fig. 3 of the drawings the opening 19 will register with the duct 11 and air may be admitted to the respective receiving chamber when the piston head 3 is moving in a direction to create suction within the chamber. On the other hand when the head 15 is rotated so as to bring the shoulder 22 in engagement with the pin 20 the opening 19 will be out of registration with the end of the duct 11 and this end of the duct will therefore be closed by the flange 18 so that no air can be drawn into the respective receiving chamber past the valve 12.

Under normal conditions the valve 12 will remain closed and the heads 15 will be rotated to such position that their flanges will close the outer or intake ends of the respective ducts 11. If, however, toward the end of the milking operation and at an intermediate point in the movement or stroke of the piston head 3 in one direction, milk in sufficient quantity cannot be drawn from the udder of the cow to fill the chamber 5 or 6, as the case may be, which at that time constitutes a receiving or suction chamber, the operator of the machine may rotate the respective valve head 15 so as to bring the opening 19 into registration with the duct 11 thus permitting the piston head 3 to complete its stroke due to the fact that air will be drawn into the respective receiving chamber in volume sufficient to complete the filling of the said chamber. By the valve devices to be presently described, when the piston is moved in the opposite direction the milk drawn into the chamber just referred to will be discharged therefrom and inasmuch as the volume of air drawn into the chamber through the duct 11 combined with the volume of milk previously drawn into the chamber is sufficient to completely fill the chamber, all of the milk will be discharged.

The valve devices for controlling the inflow and outflow of milk are greatly simplified as compared with the corresponding devices of my said copending application, the same being so constructed as to eliminate as far as possible moving parts in and between which milk might accumulate and sour thus contaminating milk subsequently delivered from the machine. The valve device includes a tubular casing indicated in general by the numeral 23, this casing being fitted at its ends through openings 24 formed in the ends or heads of the casing 2 as clearly shown in Fig. 2 of the drawings. At its opposite ends the tubular casing 23 is exteriorly threaded as indicated by the numeral 25, and fitted upon one end of the casing is a cap 26 which has a squared outer end or head 27 for the application of a wrench whereby it may be tightened and which at its inner end bears against a washer 28 fitted onto the said end of the casing and seating against a portion of the adjacent end or head of the said casing 2. A similar cap 29 is threaded onto the opposite end of the casing and is provided with a squared head 30 for the application of a wrench and at its inner end bears against a washer 31 which seats against a portion of the other end or head of the said casing 2. In this manner the tubular casing 23 is secured in a liquid-tight manner within the heads of the casing 2 and against displacement. The numeral 32 indicates a milk passageway or duct at the first mentioned end of the casing 2 and the numeral 33 indicates a similar passageway at the opposite end of the said casing 2. Pipes 34 and 35 lead from the lower ends of the passages 32 and 33 respectively and at their upper ends these passages open through the respective heads of the casing 2 and therefore communicate with the interior of the casing at opposite sides of the piston head 3, or, in other words, communicate with respective ones of the receiving chambers of the machine. The pipes 34 and 35 extend toward each other and are connected by a union 36 with a milk outlet or discharge pipe 37 through which the discharged milk may flow to a pail or other suitable receptacle.

The first mentioned end of the tubular casing 23 is interiorly increased in diameter as indicated by the numeral 38, and fitted within this enlarged portion of the casing is a tubular lining 39 of any suitable packing material as for example rubber, the inner end of this lining engaging against the shoulder 40 formed by enlarging the bore of the said casing. A reducing collar 41 is also fitted within this end of the casing 23 and secured therein in any suitable manner and abuts against the outer end of the lining 39 as clearly shown in Fig. 2. The numeral 42 indicates the milk inlet tube which may be of rubber or any other suitable material and which leads from the teat cups, as will be presently explained, and upon the end of this tube there is fitted and vulcanized or otherwise secured a collar 43 of rubber or similar material, thus providing the tube with an enlarged end and a circumscribing shoulder 44. The head 27 of the cap 26 is formed with an opening 45 through which the tube 42 is passed, the inner end of the tube bearing against the outer end of the collar 41, and the cap when tightened bearing against the shoulder 44 so as to insure of a liquid-tight fit of the tube 42 within the intake end of the casing 23. By this simple construction and arrangement of parts the tube 42 is securely connected in communication with the casing 23 in a liquid-tight manner and repairs may be readily effected. It is furthermore preferable that the collar 43 be of a length slightly greater than the distance between the outer end of the collar 41 and the outer adjacent end of the casing 23 so that prior to tightening of the cap 26, the collar 43 will project a slight distance beyond the said end or extremity of the said casing, thus providing for compression of the collar by the head of the cap 26 when the cap is tightened. In like manner the casing 23 at its opposite end is interiorly enlarged in diameter as indicated by the numeral 46 and fitted in the enlargement is a tubular lining 47 corresponding to the lining 39. This lining will presently be more specifically referred to.

The passage 32 and the casing 23 intersect as clearly shown in Fig. 2 of the drawings, and in order to provide for passage of milk past the said casing, the casing is formed with alined openings 48 which register with the said passage at the point of intersection of the passage and casing, and the tubular lining 39 is similarly formed with alined openings 49 which register with the openings 48. For the same purpose, the casing 23 at its point of intersection with the passage 33 is formed with alined openings 50, and the lining 47 is formed with openings 51 which register with the said openings 50.

The valve element of the device is indicated in general by the numeral 52 and the same comprises a tubular body 53 provided at one end with a solid stem 54 which fits slidably through an opening 55 in the head 30 of the cap 29, this stem being designed to be reciprocated in consonance with the piston head 3 either by the means illustrated and described in my said copending application or by any other suitable means. The valve body 53 fits more or less snugly within the bore of the casing 23 and within the tubular linings 39 and 47 heretofore described, the fitting of the said valve body within the linings being of a liquid-tight character so that there can be no leakage of milk past the parts. At its end opposite the stem 54, the tubular valve body 53 is open and unobstructed as indicated by the numeral 56 and adjacent this end the said body is circumferentially reduced in diameter as indicated by the numeral 57 so as to provide a passageway or by-pass 58. Inwardly of the passageway 58 the body is formed in its upper side with an opening 59. When the valve is in the position shown in Fig. 2 of the drawings, the passageway or by-pass 58 will be located in alinement with the openings 48 and 49 and the passage 32 and consequently milk may flow from the left hand receiving chamber through the said passage and past the valve into the pipe 34 and out through the discharge pipe 37. When the valve is shifted to the left in said figure, however, the opening 59 will be brought into registration with the opening 49 in the upper side of the lining 39, and with the valve in this position milk flowing in through the tube 42 will pass into the open end 56 of the valve body and through the openings 59, 49 and 48 and into the passage 32 and the said left hand receiving chamber. Substantially at its point of connection with its stem 54, the valve body 53 is formed with a diametrical opening 60 and inwardly of this opening it is formed in the upper side with an opening 61. When the valve is in the position shown in Fig. 2 the opening 61 will be in registration with the opening 51 in the upper side of the lining 47 and milk flowing into the valve body through the intake pipe 42 will pass upwardly through the said opening 61 and the openings 51 and 50 through the passage 33 into the right hand receiving chamber of the machine. On the other hand when the valve body is shifted to the left as previously mentioned above the opening 60 will be brought into registration and alinement with the opening 51 and 50 and the passage 33 and milk may flow out from the right hand receiving chamber through the said passage 33 and past the valve and thence into the pipe 35 and out through the discharge pipe 37. It will now be understood that as the valve is moved in consonance with the reciprocatory movement of the piston head 3, when the valve is in the position shown in Fig. 2 and the piston head is moving toward the left, milk which has been drawn into the left hand receiving chamber will be discharged through the passage 32 past the valve into the pipe 34 and out through the discharge pipe 37 to the collecting receptacle. At the same time the movement of the piston is creating a suction force within the right hand chamber and as a result milk will be drawn into the intake tube 42 passing through the valve body 53 and up through the opening 61 into the passage 33 and into the said right hand receiving chamber. As the piston 3 is moving on its return stroke or, in other words, toward the right in Fig. 2 and the valve 53 has been shifted so as to bring its openings 59 and 60 in alinement with the passages 32 and 33 respectively, milk drawn in through the tube 42 by reason of the suction created within the left hand receiving chamber, will pass upwardly through the opening 59 and passage 32 into the said chamber. On the other hand the milk which has been previously drawn into the right hand chamber will be discharged through the passage 33 and opening 60 into the pipe 35 and out through the discharge pipe 37. Thus in the operation of the machine there is a continual flow of milk into the machine and a continual discharge of milk from the machine.

The milk intake tube 42 shown in Fig. 2 of the drawings may lead directly to a single one or several teat cups although it is preferably to employ the arrangement shown in Figs. 1, 5, and 6, of the drawings, by which arrangement four or a less number of cows may be simultaneously milked. In this arrangement the tube 42 is replaced by a rigid tube 61 opening at its inner end into the valve casing 23 and at its outer end being fitted into one side of a valve casing 62 and communicating with the interior thereof by way of a port 63 in the said casing. This casing has preferably oppositely located branch inlet ports 64 from which lead pipes or tubes 65. The casing 62 is interiorly cylindrical to provide a valve chamber 66 and mounted for turning movement within this chamber is a segmental valve head 67 which may be rotated to such position, through manipulation of its stem 68 and a hand button 69 connected with the upper end thereof, to close either of the ports 64 or to uncover both of said ports, or the head may be rotated to position to close the port 63. Thus when the valve head 67 is in position uncovering both of the ports 64, milk may flow in through both of the tubes 65 and through the port 63 into the tube 61, and when the head is in position closing one of the ports 64, milk will be drawn in through only one of the tubes 65 and into the tube 61. On the other hand when the valve head is in position closing the port 63 no milk will be drawn in through either port 64. The branch pipes or tubes 65 which are preferably rigid communicate with other valve casings 70 substantially identical in construction with the casing 62 and each containing a valve corresponding in construction and arrangement to the valve 67, these latter valves being manipulated by hand buttons or wheels 71 upon their respective stems. Each of the casings 70 has connected to it intake pipes 72 preferably leading into the casing through opposite ends thereof and these tubes are preferably flexible and may be for example of rubber reinforced or stiffened by a suitable wrapping of wire. Each of these tubes 72 is designed to conduct the milk from a single cow and as there are four of the tubes, four cows may be simultaneously milked as will be presently explained. However, by manipulating the valves 71, any one or more of the tubes 72 may be closed so that the apparatus may be adapted for the milking of three or two cows as well as four cows or a single cow.

I make no claim herein broadly to the means for controlling the flow of milk to and from the receiving chambers which consist of a tubular valve casing and a tubular valve mounted for reciprocation in said casing and having ports and passages adapted to register alternately with the ports of the said chambers, such claims being presented in my application hereinbefore identified.

Having thus described the invention, what is claimed as new is:

1. In milking apparatus, a milk-receiving chamber, the outer end wall of the chamber having an opening therethrough to permit access to the chamber, means for admitting milk to said chamber, means for creating suction in said chamber, a plug removably fitted in and filling the opening through the end wall of said chamber and having a longitudinal air passage therethrough eccentric to its axis, a check valve carried by the plug at the inner end of said air passage and admitting air directly into the chamber and preventing escape of air therefrom, and a concentric valve disk rotatably mounted on the outer end of the plug with its edge portion extending over the outer end of the air passage and normally closing the same, said disk having an opening through its edge portion adapted to register with the outer end of the air passage and permit flow therethrough.

2. In milking apparatus, a milk receiving chamber, means for creating suction in the said chamber, an inlet for the chamber including a tubular element extending therefrom and in communication therewith and provided interiorly with a shoulder, a milk inlet tube fitted into the said tubular element and at its end against the shoulder therein, the said tube being provided with a compressible circumferential enlargement, and a cap fitted to the said tubular element and having an opening for the passage of the tube and engageable at its portion surrounding the opening against the said compressible circumferential enlargement of the tube whereby to compress the same therebetween and the said shoulder within the tubular element.

In testimony whereof I affix my signature.

JOHN C. BEEM. [L. S.]